No. 880,766. PATENTED MAR. 3, 1908.
C. L. VANDERVORT.
CAR DOOR.
APPLICATION FILED APR. 30, 1907.
2 SHEETS—SHEET 1.
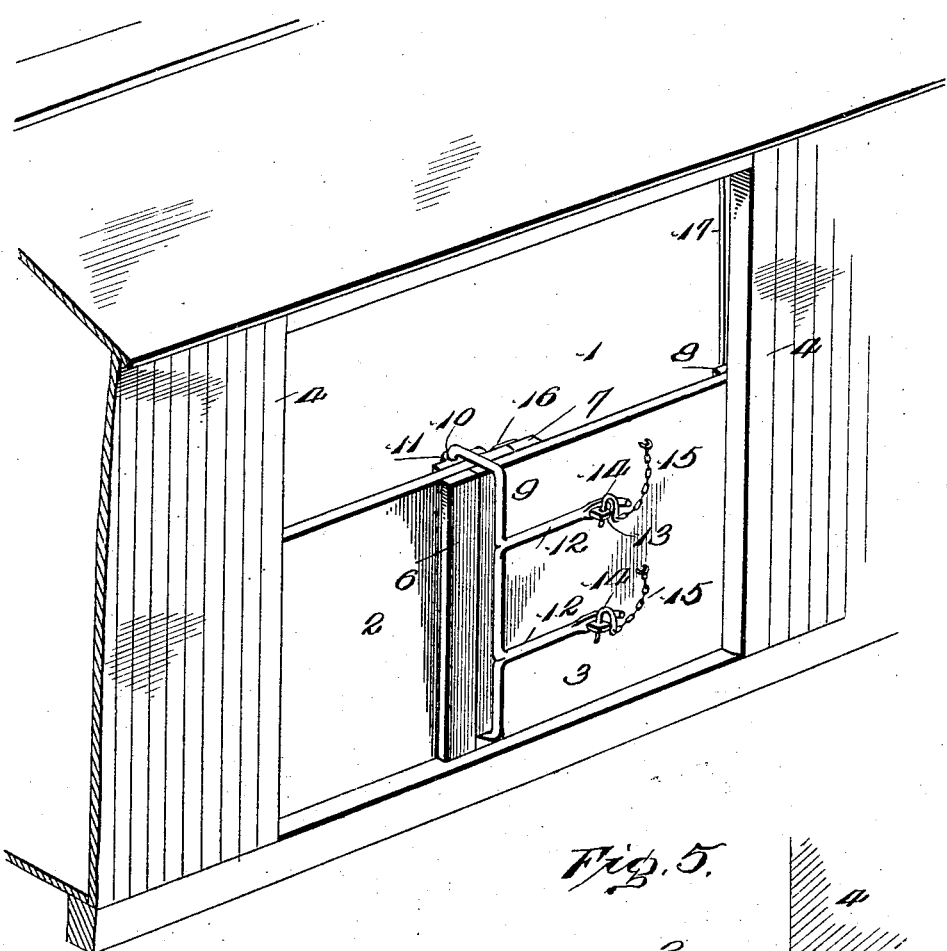
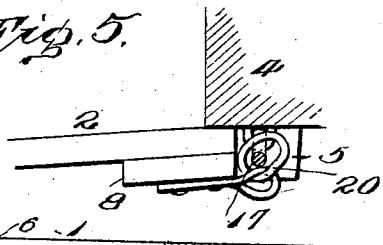
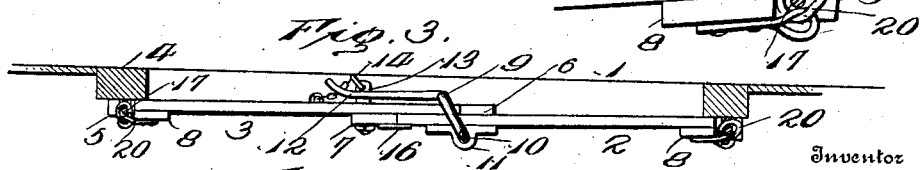
Witnesses 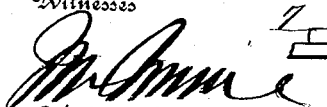
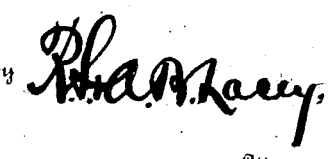
Inventor
C. L. Vandervort.
Attorneys

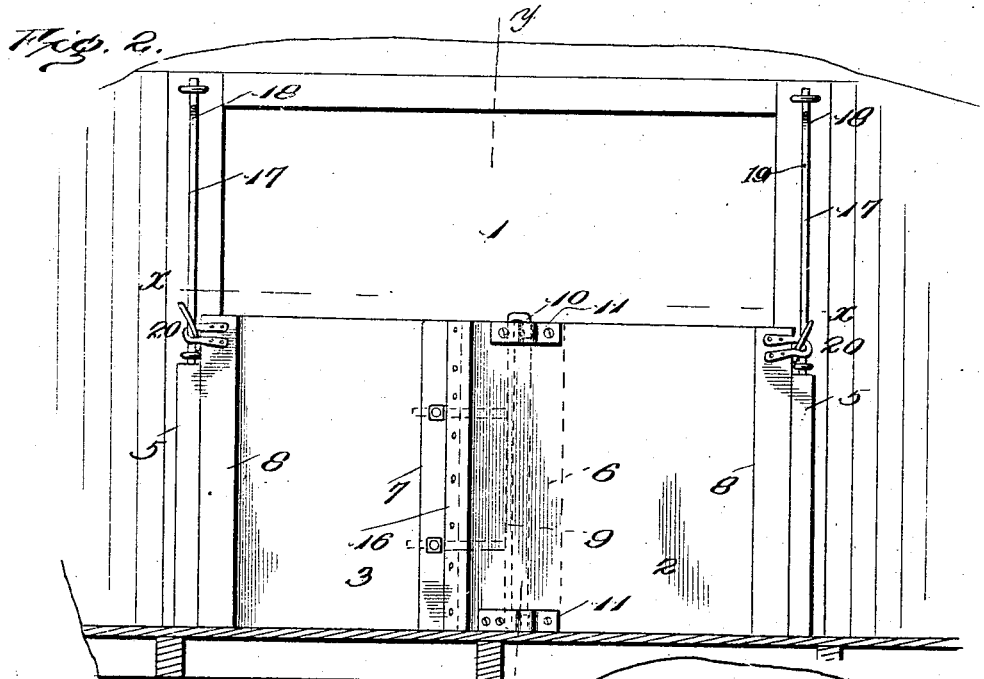
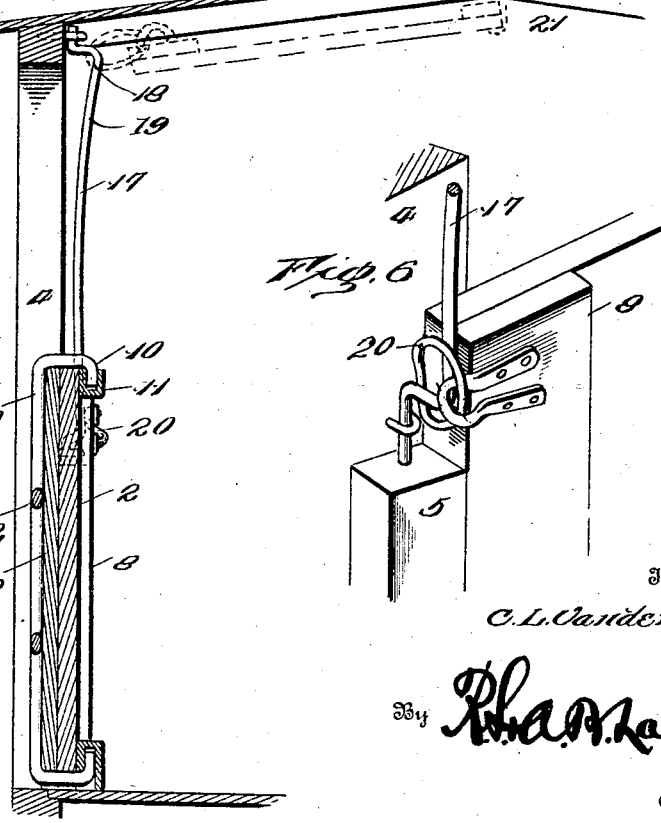

UNITED STATES PATENT OFFICE.

CHARLES L. VANDERVORT, OF ENDERLIN, NORTH DAKOTA.

CAR-DOOR.

No. 880,766.  Specification of Letters Patent.  Patented March 3, 1908.

Application filed April 30, 1907. Serial No. 371,089.

*To all whom it may concern:*

Be it known that I, CHARLES L. VANDERVORT, citizen of the United States, residing at Enderlin, in the county of Ransom and State of North Dakota, have invented certain new and useful Improvements in Car-Doors, of which the following is a specification.

Box cars used for transporting grain, fertilizer and other commodity in bulk, generally have the opening in the side closed by doors which are either destroyed or seriously injured when opened to admit of unloading, this being due to the fact that the doors are usually nailed to the door jambs and require to be battered down when the car reaches its destination or place of unloading. This practice besides resulting in injury or destruction to the doors, also entails injury to the door jambs by the driving of nails therein and the application of force to effect release of the doors.

The present invention provides a door which may be readily opened to permit the discharge of the load and which may be hung from the roof of the car when not required for immediate service, said door being of such construction as to preclude the waste of any grain, fertilizer or other material stored in the car in bulk.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a portion of a box car having its door opening closed by means embodying the invention. Fig. 2 is a view of the door and adjacent parts as seen from the inner side. Fig. 3 is a horizontal section on the line x—x of Fig. 2. Fig. 4 is a vertical section on the line y—y of Fig. 2. Fig. 5 is a horizontal section of an end portion of the door showing the rod and link connection between it and a door jamb. Fig. 6 is a detail perspective view of the parts illustrated in Fig. 5. Fig. 7 is a top plan view of the overlapped portions of the door sections.

Corresponding and like parts are referred to in the following description and indicated in all the views of the drawings by the same reference characters.

The door for closing the door opening 1 is formed of sections 2 and 3 which have end portions overlapped and secured by a lock device having pivotal connection with an end portion of one section and adapted to confine the end portion of the other section by engaging thereover. The door is of a length to overlap the inner sides of the door jambs 4 and to abut against strips 5 attached to the inner sides of said door jamb, thereby preventing longitudinal displacement of the door when in position. A cleat 6 is secured to the outer side of the section 2 near the end adapted to overlap the section 3 and stiffens and braces said section besides forming an abutment for the end of the section 3. A cleat 7 is similarly attached to the inner side of the section 3 for a like purpose, viz: to stiffen and brace said section and to form an abutment for the end of the section 2. It will thus be understood that when the door is in place, the sections are confined and prevented from longitudinal displacement by means of the strips 5 and the cleats 6 and 7. Inward displacement of the door is prevented by the commodity stored in the car and outward displacement is provided against by engagement of the door with the jambs 4. Cleats 8 are secured to the inner sides of both sections at or near the ends adapted to engage with the door jambs and serve to strengthen and brace the said sections. In the event of the door sections being formed of horizontally arranged boards, the latter may be nailed, or bolted or otherwise fastened to the vertically arranged cleats 6, 7 and 8.

For securing the overlapped end portions of the sections 2 and 3, a rod or bar 9 is provided, the end portions thereof being bent about at a right angle to extend over the upper and lower edges of said overlapped ends and rebent forming journals 10 which are mounted in bearings 11 secured to the inner side of the section 2. The lock rod is adapted to swing on the journals 10 either to clear the section 3 or to engage therewith when the sections are placed in position so as to confine the overlapped end portions thereof. Arms 12 project from the rod or bar 9 at a right-angle and have openings at or near their outer ends to receive eye bolts or staples 13 attached to the outer side of the section 3. It is to be understood that one or more arms 12 may be employed as occasion may require. The arms 12 afford convenient means for operating the lock device and also for securing the same when turned into locking position. After the arms 12 have been engaged with the eye bolts or like fastenings 13, they may be secured by hooks 14 or other fastening means passed through the openings of said eye bolts. To prevent displacement of the hooks or fastenings 14, they are connected to the section 3 by means of short lengths of chain 15.

A metallic strip 16 is attached to the outer edge portion of the cleat 7 and projects beyond the same a short distance to engage with the inner side of the section 2 and thereby prevent material entering the space formed between the section 2 and the cleat 7. Moreover said strip 16 assists materially in holding or confining the end of the section 2.

Rods 17 are journaled at their ends to the jambs 4 and are provided near their upper ends with off-sets forming shoulders 18. The rods adjacent to the shoulders are slightly curved as indicated at 19, thereby resulting in the provision of shoulders 18 of extra length so as to insure a reliable support for the door when elevated and suspended so as not to be in the way. Links 20 are secured to the upper outer corners of the door and receive the rods 17 which pass therethrough. These links in conjunction with the rods support the sections of the door when the same are released and swung outward. When the door is not required for immediate service, the sections thereof are secured by the lock device and the door is raised and the links 20 engaged over the shoulders 18. The door may thus be held raised or elevated but if desired, it may be swung upward beneath the ceiling or roof of the car and secured by means of hooks 2, or like fastening means.

When the door is in position, its end portions are overlapped and confined by the lock device and the strip 16, the arms 12 of the rod 9 being engaged with the eyebolts 13 and held thereto by means of the fastenings 14. To release the rod, the fastenings 14 are removed and the arms 12 disengaged from the eye-bolt 13 and swung outward, thereby withdrawing the rod 9 from engagement with the end of the section 3 when the pressure of the inner side of the door will cause said sections to swing outward, the sections being retained in place by means of the links 20 and the rods 17 in the manner herein stated.

Having thus described the invention, what is claimed as new is:

1. A car door comprising sections having end portions overlapped, cleats secured to the respective sections a short distance from the extremities of the overlapped end portions, and lock means confining the overlapped portions of the sections to prevent outward displacement thereof, the same comprising parts embracing the edges of the overlapped portions of the said sections when closed.

2. A car door composed of sections adapted to have end portions overlapped, a rod having end portions bent to extend over opposite edges of one section, and having the terminal portions of the bent ends rebent to provide journals which are mounted in bearings applied to the other section, said rod adapted to be swung to engage with and confine the overlapped ends of the sections, an arm projected from the side rod, and means for securing said arm when turned upon one of the sections.

3. A car door comprising sections having end portions overlapped, cleats secured to the end portions of the sections a short distance from their extremities to form abutments for the ends of the sections to engage with, a strip attached to one of the cleats and adapted to overlap the end portion of the opposite section, a rod having its end portions bent to extend over the overlapped edges of the sections and rebent to provide journals, bearings applied to the inner section to receive said journals, an arm projected from the rod to form operating means therefor and having an opening at or near its outer end, an apertured fastening applied to the outer section of the door to pass through the opening of the aforesaid arm, and fastening means for securing the arm when turned upon the section.

In testimony whereof I affix my signature in presence of two witnesses.

CHARLES L. VANDERVORT. [L. S.]

Witnesses:
J. R. CRUFF,
C. A. KVELLO.